United States Patent
Steffen

(10) Patent No.: US 7,447,618 B2
(45) Date of Patent: Nov. 4, 2008

(54) METHOD AND SYSTEM FOR ASIC SIMULATION

(75) Inventor: David N. Steffen, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 486 days.

(21) Appl. No.: 11/126,988

(22) Filed: May 11, 2005

(65) Prior Publication Data

US 2006/0259290 A1   Nov. 16, 2006

(51) Int. Cl.
G06F 17/50 (2006.01)
(52) U.S. Cl. .............................. 703/14; 703/27; 703/28; 716/4; 714/29; 714/30
(58) Field of Classification Search .................... 703/14, 703/13, 26–28; 716/4; 714/28–30
See application file for complete search history.

(56) References Cited

U.S. PATENT DOCUMENTS 6,028,996 A * 2/2000 Sniderman et al. ............ 703/28

OTHER PUBLICATIONS

Hahn et al., D. Implmentation of a PCI Bus Virtual Driver Using PLI, Named Pipes, and Signals, IEEE Int. Verilog HDL Conference, Mar.-Apr. 1997, pp. 10-13.*

* cited by examiner

*Primary Examiner*—Russell Frejd
(74) *Attorney, Agent, or Firm*—Klein, O'Neill & Singh, LLP

(57) ABSTRACT

Method and system for testing an Application Specific Integrated Circuit is provided. The system includes, a simulator that interfaces with a host computer emulation module; and a virtual interface driver ("VID") that interfaces with the host computer emulation module and a bus interface module, wherein the VID maps plural stimulus to the simulator via the bus interface module. The method includes, loading a bus functional module in an ASIC simulator; determining configuration of devices supported by a host emulation system; and mapping configuration information to the host emulation system, wherein a virtual interface driver maps the configuration information to the host emulation system.

12 Claims, 6 Drawing Sheets

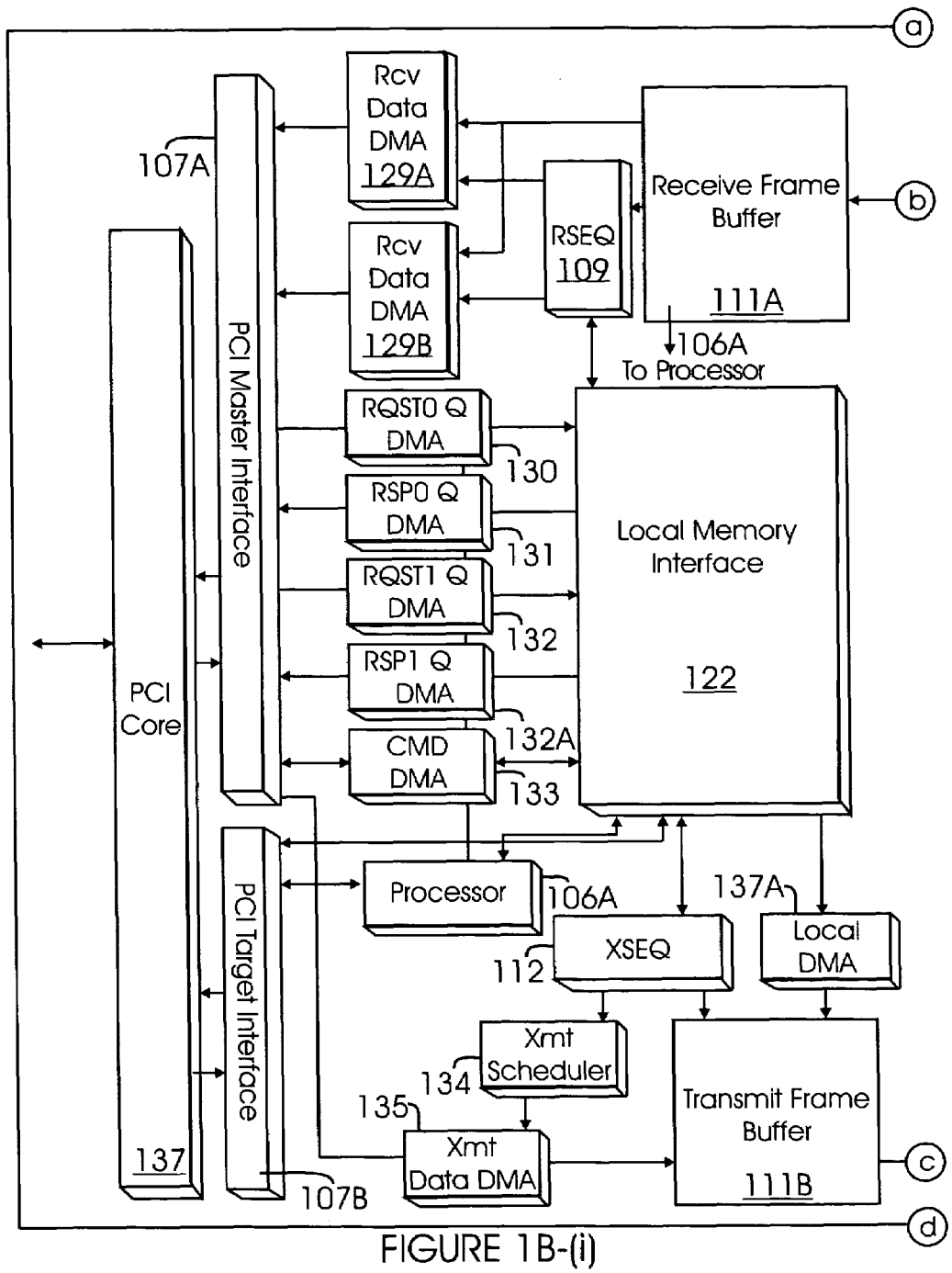
FIGURE 1B-(i)

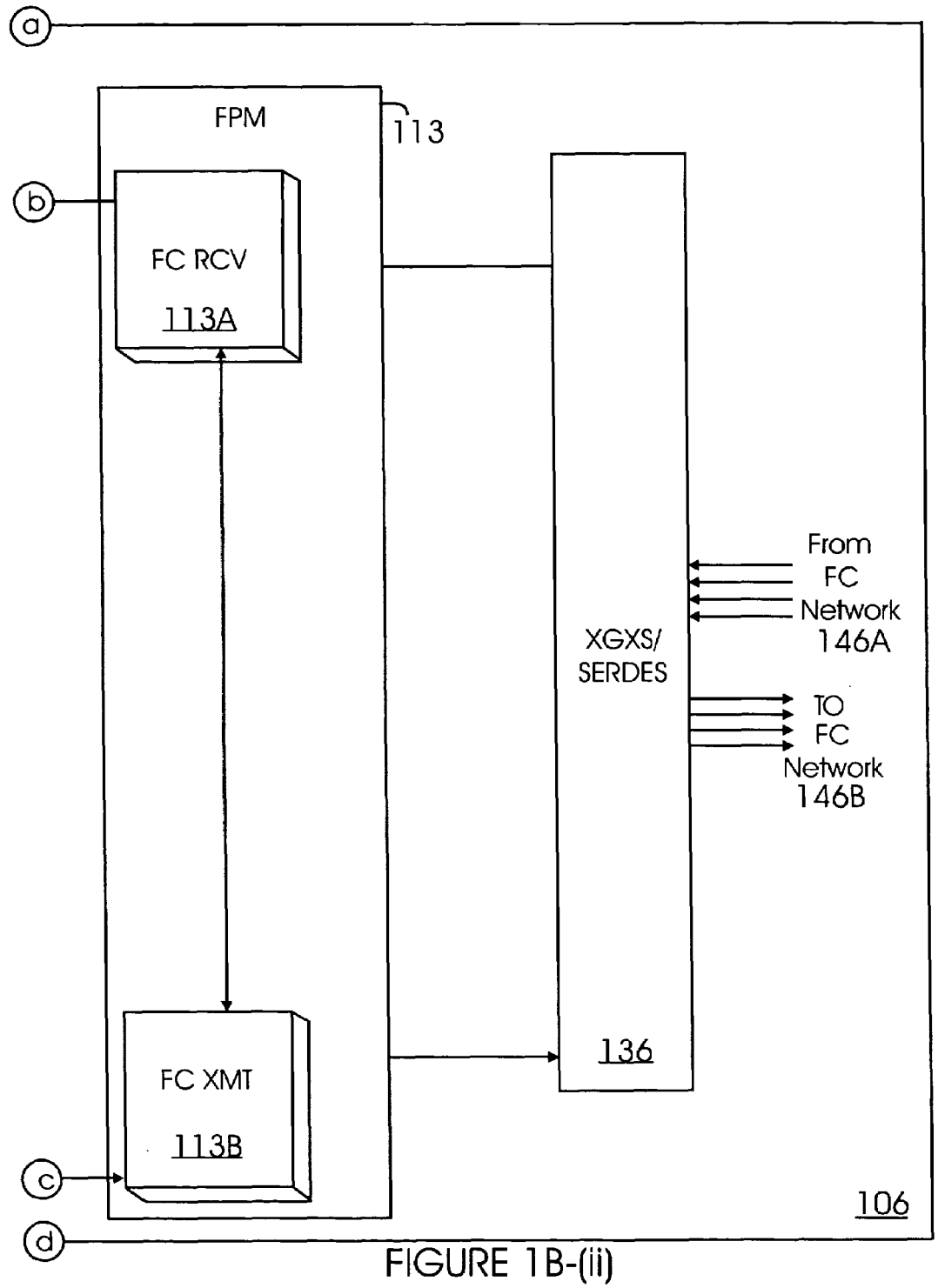
FIGURE 1B-(ii)

METHOD AND SYSTEM FOR ASIC SIMULATION

BACKGROUND

1. Field of the Invention

The present invention relates to host bus adapters, and more particularly, to simulation techniques.

2. Background of the Invention

Application Specific Integrated Circuits ("ASICs") are commonly used in various computing functions. Typically, while an ASIC is being designed and before a foundry fabricates it, the ASIC is verified and tested in a simulation environment. After fabrication, the ASIC is tested to perform in real life situations using lab equipment.

In a conventional simulation environment, an ASIC is tested to verify the ASIC's capability. Special code is developed for testing and de-bugging the ASIC, and after the testing is complete, the code is discarded. Reworking ASICs is expensive and labor intensive and hence, it is desirable to have an efficient way to test/simulate ASICs.

Simulations are not reliable because the simulation environment and the actual ASIC software/firmware environment may be different. This problem is highlighted in simulating host bus adapters, used in storage area networks ("SANs").

SANs are commonly used where plural memory storage devices are made available to various host computing systems. Data in a SAN is typically moved between plural host systems (that include computer systems, servers etc.) and storage systems (or storage devices, used interchangeably throughout this specification) through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety.

PCI-Express is another Input/Output ("I/O") bus standard (incorporated herein by reference in its entirety) used in this environment. PCI-Express uses discrete logical layers to process inbound and outbound information.

To manage the cost of developing ASICs in general and HBAs in particular, effective simulation and testing techniques are needed.

Therefore, there is a need for an efficient host emulation technique that is substantially similar to the real-life target environment.

SUMMARY OF THE INVENTION

In one aspect of the present invention, a system for testing an Application Specific Integrated Circuit is provided. The system includes, a simulator that interfaces with a host computer emulation module; and a virtual interface driver ("VID") that interfaces with the host computer emulation module and a bus interface module, wherein the VID maps plural stimulus to the simulator via the bus interface module.

The VID determines configuration of devices that are supported by the host bus interface module; and maps configuration of devices that are supported to the host computer emulation module.

In yet another aspect of the present invention, a method for testing application specific integrated circuits ("ASICs") is provided. The method includes, loading a bus functional module in an ASIC simulator; determining configuration of devices supported by a host emulation system; and mapping configuration information to the host emulation system, wherein a virtual interface driver maps the configuration information to the host emulation system.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B shows a block diagram of an example of a HBA, that is tested, according to one aspect of the present invention;

DETAILED DESCRIPTION OF THE PREFERRED EMBODIMENTS

To facilitate an understanding of the preferred embodiment, the general architecture and operation of a storage system/HBA will be described. The specific architecture and operation of the preferred embodiment will then be described with reference to the general architecture.

Figure 1A:
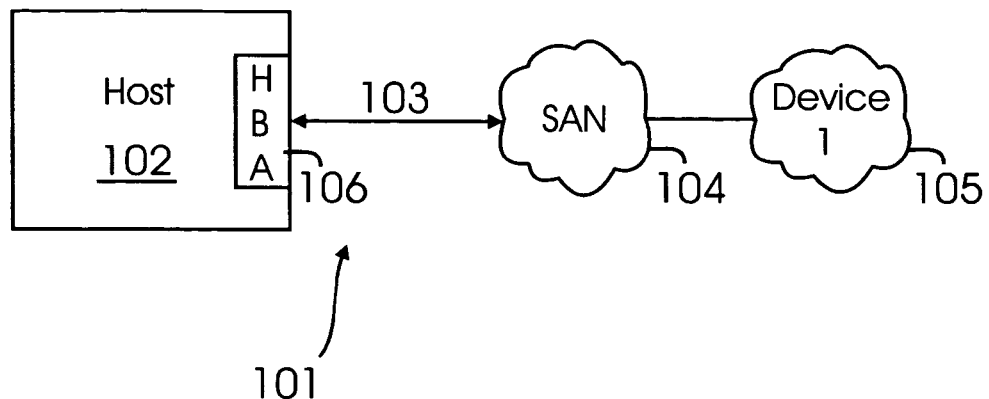
FIG. 1A shows a block diagram of a network using a host and a HBA.

FIG. 1A shows a block diagram of a system 101 where a host computing system 102 is coupled to a storage device 105 via a SAN 104. HBA 106 facilitates data transfer between host 102 and device 105 (shown as 103).

FIG. 1B shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from a host memory (not shown) to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory (not shown) and local memory interface 122. Memory interface 122 is provided for managing local memory. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa.

Adapter 106 also includes request queue DMA channel (0) 130, response queue (0) DMA channel 131, response queue (1) 132A, and request queue (1) DMA channel 132; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

PCI (or PCI-X) master interface 107A and PCI (or PCI-X) target interface 107B are both coupled to a PCI-Express Core logic 137 (may also be referred to as "logic 137"). Interface 107A and 107B includes an arbitration module that processes DMA access to plural DMA channels.

Figure 2A:
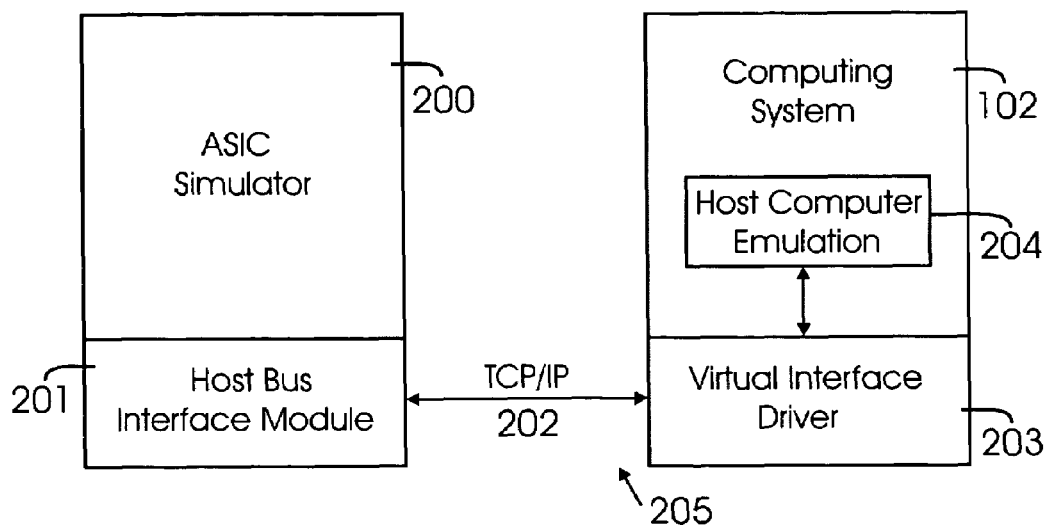
FIG. 2A shows a block diagram of a system using a virtual interface driver, according to one aspect of the present invention.

FIG. 2A shows a top-level block diagram of a system 205 for testing ASICs in general and a HBA in particular, according to one aspect of the present invention.

System 205 includes the ASIC simulator 200, which can be a standard hardware description language simulator. Simulator 200 interfaces with a host interface bus functional module (also referred to as "HIBFM") (shown as Host bus interface module in FIG. 2A) 201. HIBFM 201 can be configured to receive any stimulus from computing system 102. HIBFM 201 is a layered interface that is described below with respect to FIG. 2B.

Host system 102 (also referred to as computing system in FIG. 2A) uses a host computer emulation ("HCE") program (or module) 204 that interfaces with a virtual interface device driver ("VID") 203. There are standard emulation programs, for example, VMware available from VMWare Corp. and VirtualPC available from Microsoft® Corporation, used to emulate real hardware to software. The standard programs typically do not interface well with custom interfaces, like VID 203. HCE 204 is an enhanced emulation tool that operates with VID 203. Software executing in the HCE 204 environment believes that it is interfacing with hardware components, while in fact it is interfacing with software that behaves like hardware.

HCE 204 interfaces with HIBFM 201 via VID 203, using for example, a TCP/IP link 202. VID 203 maps all HCE 204 actions involving simulator 200 and drives the appropriate stimulus (for example, A PCI Memory Read Cycle) to simulator 200 via HIBFM 201.

Any stimulus sensing (for example, PCI Interrupt detection) performed by HIBFM 201 is sent to VID 203 that is then mapped to HCE 204.

Figure 3:
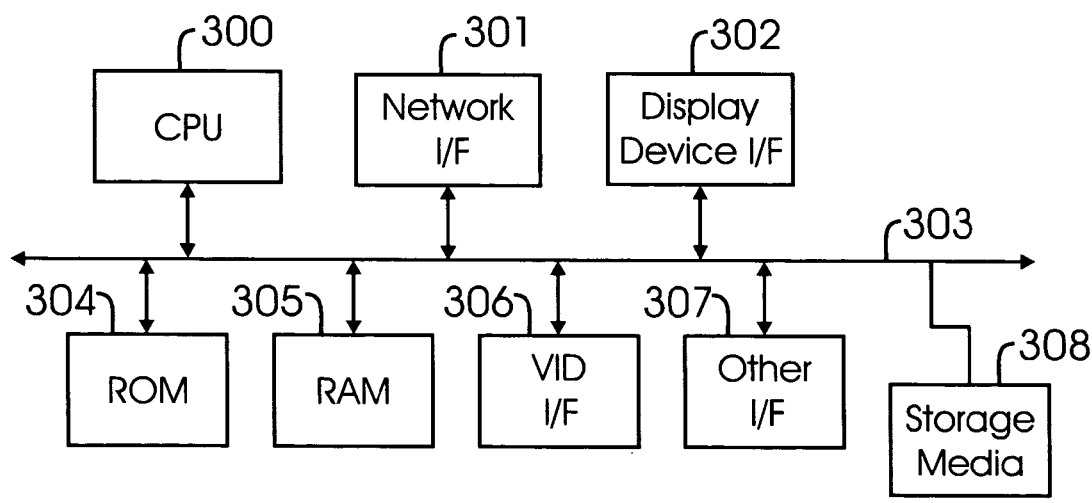
FIG. 3 shows a block diagram of the internal architecture of a computing system, used according to one aspect of the present invention.

Before describing the detailed architecture of system 205, the following describes the overall architecture of computing system 102, with respect to FIG. 3. As shown in FIG. 3, system 102 includes a CPU 300 for executing computer-executable process steps and interfaces with a computer bus 303. Also shown in FIG. 3 are a network interface 301, a display device interface 302, VID Interface 306, interface for various other devices (for example, a mouse, keyboard and others) 307 and storage media (for example, hard drive, CD-ROM, CD-R/W, flash memory, tape drive and others) 308.

Storage media 308 stores operating system program files, application program files, and other files. Some of these files are stored using an installation program. For example, CPU 300 executes computer-executable process steps of an installation program so that CPU 300 can properly execute the application program.

A random access main memory ("RAM") 305 also interfaces to computer bus 303 to provide CPU 300 with access to memory storage. When executing stored computer-executable process steps from storage media 308, CPU 300 stores and executes the process steps out of RAM 305.

Read only memory ("ROM") 304 is provided to store invariant instruction sequences such as start-up instruction sequences or basic input/output operating system (BIOS) sequences.

Network Interface 301 allows computing system 102 to connect (for example, using TCP/IP link 202, FIG. 2A) with other systems via a network.

Figure 2B:
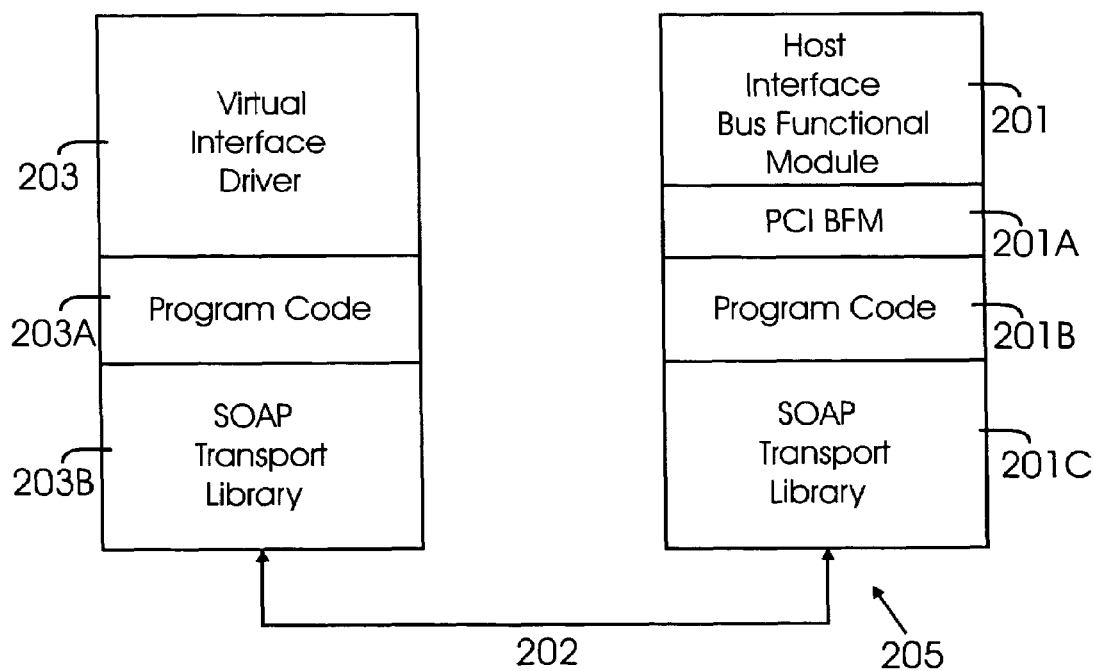
FIG. 2B shows yet another block diagram for testing ASICs, according to one aspect of the present invention.

FIG. 2B shows a block diagram with various functional modules of VID 203 and HIBFM 201. It is noteworthy that although the block diagram shows a modular structure, the adaptive aspects of the present invention are not limited to any particular structure. The entire functionality of VID 203 and/or HIBFM 201 may be included in a single or multiple modules.

VID 203 includes program code 203A and a standard SOAP transport library 203B. VID 203 maps the ASIC under test in simulator 200 into a virtual address space of HCE 204. Requests for register read/write(s) are intercepted by VID 203 and then converted to transaction requests by program code (or "module" used interchangeably) 203A. These transaction requests are then sent to HIBFM 201 via the TCP/IP connection 202.

SOAP transport library 203B and 201C facilitate communication between VID 203 and HIBFM 201. Requests from program code 203A are interpreted by program module (or code) 201B in HIBFM 201. Program module 201B requests bus functional module "PCI BFM" 201A to modify modeled hardware registers. BFM 201A detects the changes and executes the changes.

HIBFM 201 contains a register semaphore (not shown) that is used to synchronize interaction with module 201A. A bit (for example, a "go bit") is set by VID 203 to indicate that a request is properly formed in the modeled hardware registers in HIBFM 201. Upon detection of a change to the "go bit", the HIBFM 201 performs the requested function. The HIBFM 201 indicates completion of the request by resetting the "go bit", which in turn signals the VID 203 to inspect the results and resume operation.

After a transaction is completed program module 201B notifies program module 203A. Program module 203A then inspects the modeled hardware registers to determine results and interrupt states. The results and status are then translated back into HCE 204 for further processing.

Figure 4:
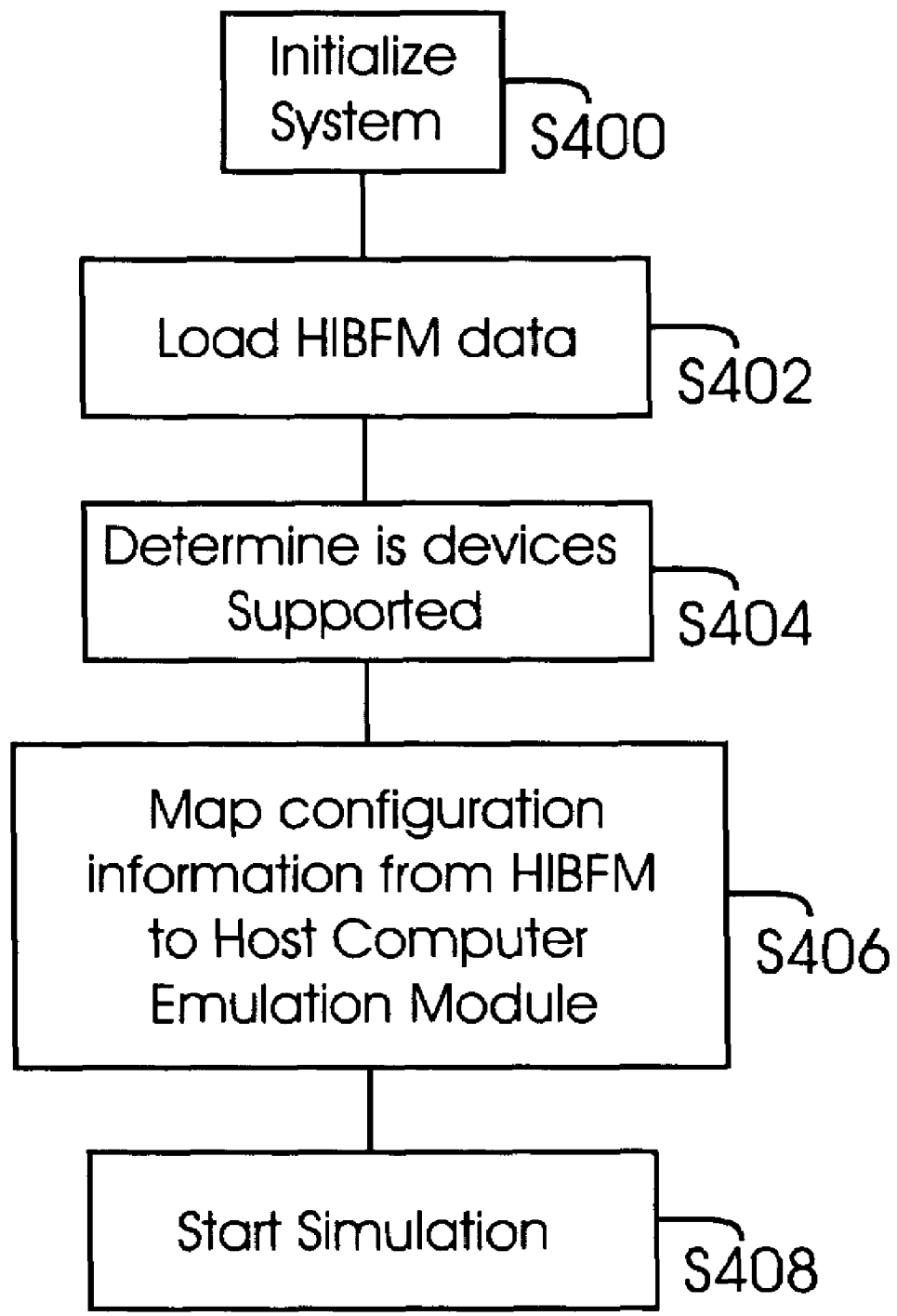
FIG. 4 shows a process flow diagram for testing ASICs, according to one aspect of the present invention.

FIG. 4 shows a process flow diagram of executable process steps for testing ASICs, according to one aspect of the present invention, In step S400, simulator 200 is initialized.

In step S402, HIBFM 201 is loaded and that starts HCE 204. In step S404, VID 203 determines the configuration of the device, if the device is supported.

In step S406, the configuration information is mapped to HCE 204 and the simulation begins in step S408.

Figure 5:
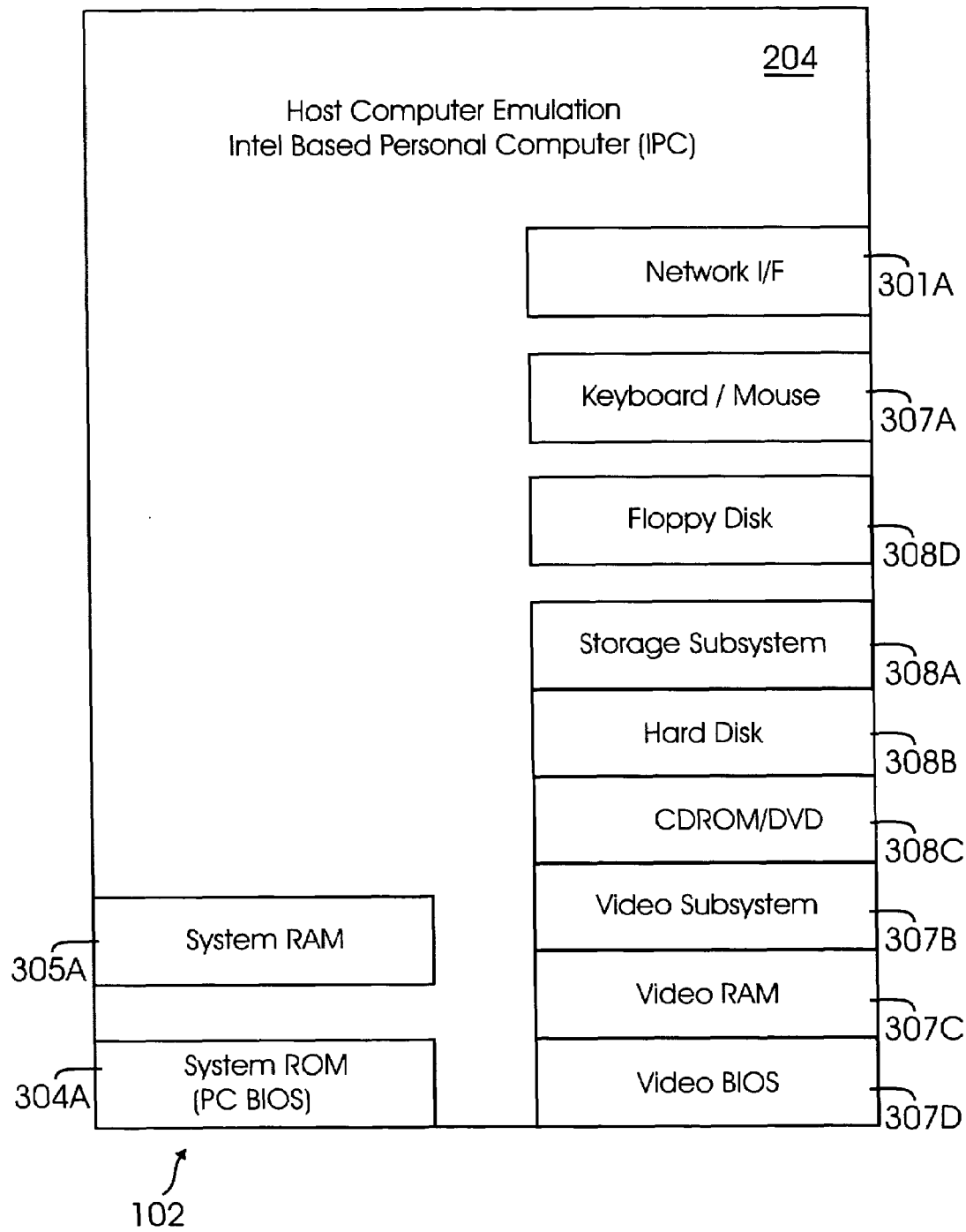
FIG. 5 shows an example of emulating a host computer, according to one aspect of the present invention.

To illustrate how the system operates, the following provides an illustration for simulating a personal computer (for example, an Intel® based personal computer ("IPC")) startup sequence with a PCI device connected in simulator 200. FIG. 5 shows an example of various sub-systems that are emulated by HCE 204 in host system 102. HCE 204 operates as a virtual host system with plural virtual modules, for example, network I/F module 301A, keyboard/mouse 307A, floppy disk 308D, IDE subsystem 308A, IDE hard disk 308B, IDE CD-ROM 308C, video subsystem 307B, Video RAM 307C and Video BIOS 307D.

HCE 204 using CPU 300 emulates the instruction set of a host system and executes software from System ROM 304A. System ROM 304A is a real BIOS image of start-up instructions. When instructions in the program code reference any of the aforementioned emulated sub-systems, HCE 204 emulates the sub-system as if it was executing on real hardware. For example, when the system BIOS detects the presence of Video BIOS 307D in Video Subsystem 307B, HCE 204 executes the code for Video BIOS 307D as if it were a real video system. The code responsible for emulating the video sub-system interprets the various accesses and maps the stimulus to a "virtual monitor" (a display device), which is then displayed in a window on computing system 102.

When HCE 204 accesses storage sub-systems (for example, hard disk 308B) then the storage sub-system is mapped to actual storage media on computing system 102 (for example, 308). Other resources like system RAM 305A, keyboard/mouse 307A and network interface 301A are also redirected to computing system 102 resources.

When the IPC emulation starts up, it inspects PCI slots using PCI configuration cycle to determine what devices are present and the resources that each device needs.

HCE 204 functions as a standard emulation system, until such time it needs to execute a PCI configuration cycle for the device in simulator 200. Instead of emulating the cycles associated with simulator 200, VID 203 requests HIBFM 201 to stimulate simulator 200 the same way real hardware will behave. Before HCE 204 resumes, HIBFM 203 transfers the results back to VID 203, which in turn returns the result to HCE 204.

The start-up sequence for IPC includes various PCI Configurations (specified by the PCI standard) reads and writes. The start-up sequence uses data obtained from VID 203 to determine hardware configuration and then performs another set of PCI configuration reads and writes to configure hardware for runtime operations. VID 203 maps requests to HIBFM 201 and interprets PCI configuration writes for their effect on mapping hardware in simulator 200.

In one aspect of the present invention, for system 205 to operate reliably and efficiently, simulator 200 suspends simulation when HCE 204 is executing, and vice-versa.

In another aspect of the present invention, the invention allows simulation to be executed on more than one CPU. Because HIBFM 201 communicates with VID 203 via a TCP/IP 202 connection, the simulation effort can be shared to increase performance or executed on computing systems 102 that are geographically disparate.

In another aspect of the present invention, the same software code can be used to test the ASIC in the simulation and laboratory environment. Because the code is developed and tested in simulation, the laboratory development cycle is shortened, which results in the significant reduction of the development effort.

In yet another aspect of the present invention, the ASIC can be tested with the actual intended system software. Rather than testing in an artificial environment, the ASIC is tested with a real software environment such as Microsoft Windows, Sun Solaris, or Linux.

In yet another aspect of the present invention, system software and drivers can be developed and tested before an ASIC is fabricated.

Although the present invention has been described with reference to specific embodiments, these embodiments are illustrative only and not limiting. Many other applications and embodiments of the present invention will be apparent in light of this disclosure and the following claims.

What is claimed is:

1. A system for testing an Application Specific Integrated Circuit (ASIC), comprising:

a first computing system executing a simulator for simulating a plurality of ASIC operations; wherein the simulator interfaces with a host bus interface module (HIBFM) configured to receive a stimulus via a network link; and a second computing system executing a host computer emulation (HCE) module and a virtual interface driver (VID); wherein the HCE module emulates operations executed by a host system in a virtual environment; and the VID interfaces with both the HCE and HIBFM; and wherein the VID (a) maps configuration information regarding the ASIC under test in the simulator to a virtual address space of the HCE; (b) formats a transaction request from the HCE; (c) transmits the formatted transaction request to the HIBFM, and provides a stimulus for the ASIC under test; and (d) after the simulator executes an operation in response to the stimulus, the VID receives operation results transmitted by the HIBFM via the network link.

2. The system of claim 1, wherein the VID determines configuration of devices that are supported by the HIBFM.

3. The system of claim 2, wherein the VID maps configuration of devices that are supported to the host computer emulation module.

4. The system of claim 1, wherein the host bus interface module sends information from the simulator to the host computer emulation module via the VID.

5. A method for testing an application specific integrated circuit ("ASIC"), comprising:

loading a host bus interface functional module HIBFM in an ASIC simulator executed by a first computing system; wherein the simulator simulates a plurality of ASIC operations;

determining configuration of devices supported by a host emulation system HCE executed by a second computing system; wherein the HCE emulates operations executed by a host computing system in a virtual environment; and a virtual interface driver (VID) executed by the second computing system determines configuration information by interfacing with the HIBFM via a network link; and mapping the configuration information to the HCE, wherein the VID (a) maps configuration information regarding the ASIC under test in the simulator to a virtual address space of the HCE; (b) formats a transaction request from the HCE involving the ASIC; (c) transmits the formatted transaction request to the host and provides a stimulus for the ASIC under test; and (d) after the simulator executes an operation in response to the stimulus, the VID receives operation results transmitted by the HIBFM via the network link.

6. The method of claim 5, wherein the virtual interface driver maps requests for register read and write operations to the host emulation system and converts them into transaction requests.

7. The method of claim 5, wherein the transaction requests are sent to the HIBFM.

8. The method of claim 5, wherein the ASIC under test is used for a host bus adapter.

9. A system for testing a host bus adapter used in a network, comprising:
  a first computing system executing a simulator for simulating a plurality of ASIC operations; wherein the simulator interfaces with a host host bus interface module (HIBFM) configured to receive a stimulus via a network link; and
  a second computing system executing a host computer emulation (HCE) module and a virtual interface driver (VID); wherein the HCE module emulates operations executed by a host system in a virtual environment; and the VID interfaces with both the HCE and HIBFM; and
  wherein the VID (a) maps configuration information regarding the ASIC under test in the simulator to a virtual address space of the HCE; (b) formats a transaction request from the HCE; (c) transmits the formatted transaction request to the HIBFM and provides a stimulus for the ASIC under test; and (d) after the simulator executes an operation in response to the stimulus, the VID receives operation results transmitted by the HIBFM via the network link.

10. The system of claim 9, wherein the VID determines configuration of devices that are supported by the host bus interface module.

11. The system of claim 10, wherein the VID maps configuration of devices that are supported to the host computer emulation module.

12. The system of claim 10, wherein the host bus interface module sends information from the simulator to the host computer emulation module via the VID.

* * * * *

UNITED STATES PATENT AND TRADEMARK OFFICE
CERTIFICATE OF CORRECTION

PATENT NO. : 7,447,618 B2
APPLICATION NO. : 11/126988
DATED : November 4, 2008
INVENTOR(S) : David N. Steffen Page 1 of 1

It is certified that error appears in the above-identified patent and that said Letters Patent is hereby corrected as shown below:

On the Title page, in Item (56), in column 2, under "Other Publications", line 1, delete "Implmentation" and insert -- Implementation --, therefor.

In column 5, line 6, delete "invention," and insert -- invention. --, therefor.

In column 6, line 56, in claim 5, delete "HIBFM" and insert -- (HIBFM) --, therefor.

In column 6, line 61, in claim 5, delete "HCE" and insert -- (HCE) --, therefor.

In column 7, line 23, in claim 9, after "host" delete "host".

Signed and Sealed this

Nineteenth Day of October, 2010

David J. Kappos
*Director of the United States Patent and Trademark Office*